Oct. 11, 1938.  D. W. BOYLAN  2,133,014
PIPE COATING APPARATUS
Filed Oct. 28, 1936  3 Sheets—Sheet 1
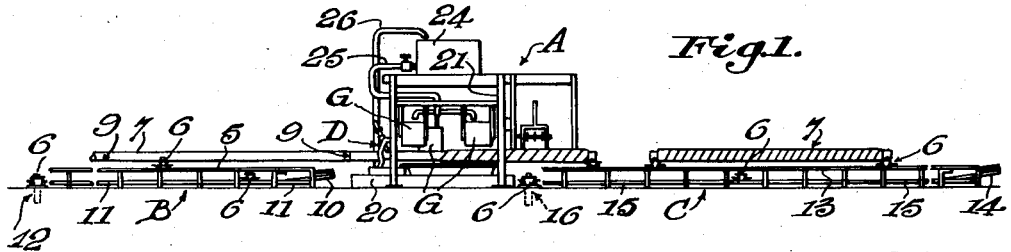
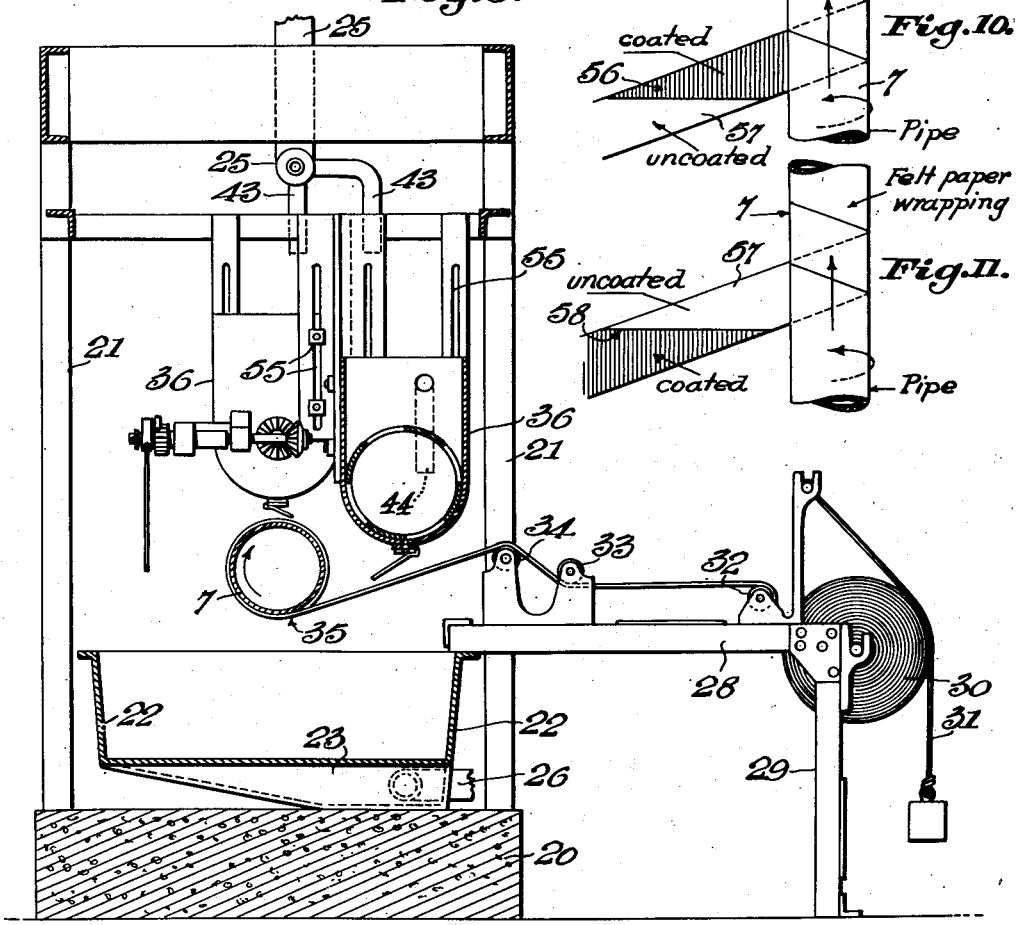
INVENTOR.
David W. Boylan,
BY
ATTORNEY.

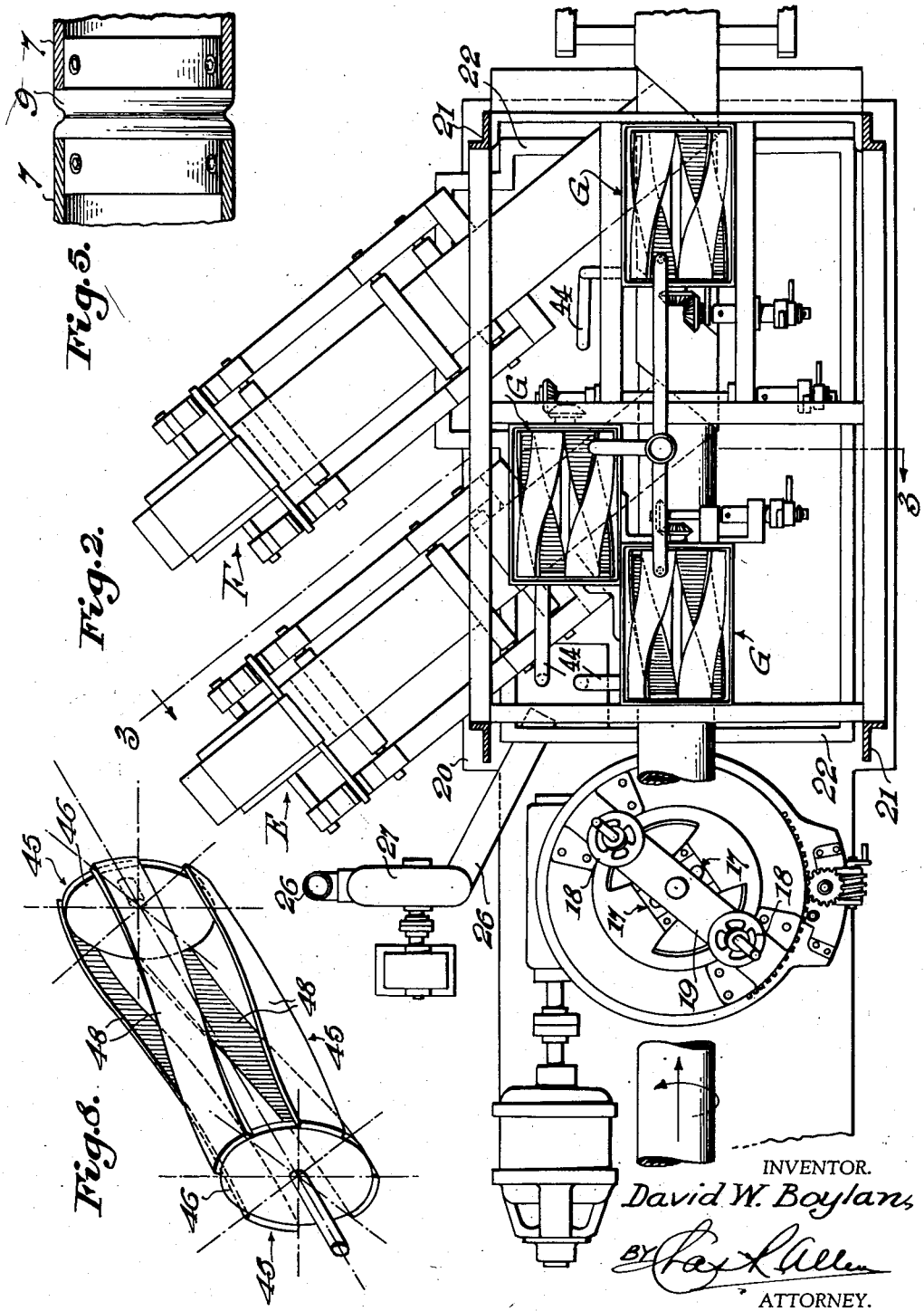

Oct. 11, 1938.   D. W. BOYLAN   2,133,014
PIPE COATING APPARATUS
Filed Oct. 28, 1936   3 Sheets-Sheet 3

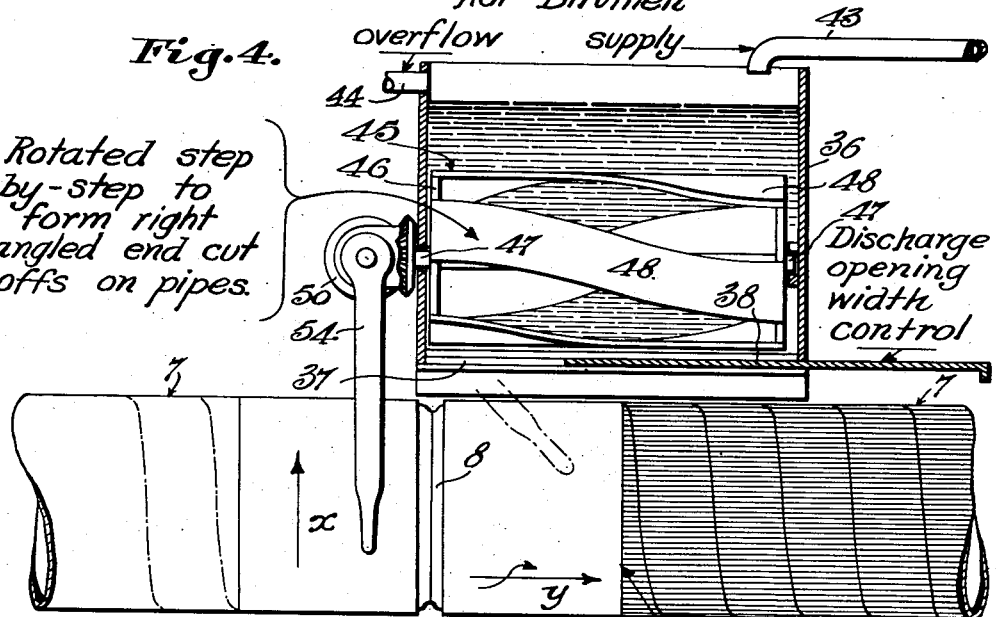

Fig. 4.

Hot Bitumen overflow supply

Rotated step by-step to form right angled end cut offs on pipes.

Discharge opening width control

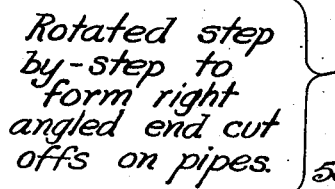

Gradual opening of slot at same speed as pipe is moving starts coating at right angles to center line of pipe Pipe rotating and also moving longitudinally Gradual closing of slot at same speed as pipe is moving terminates coating at right angles to center line of pipe.

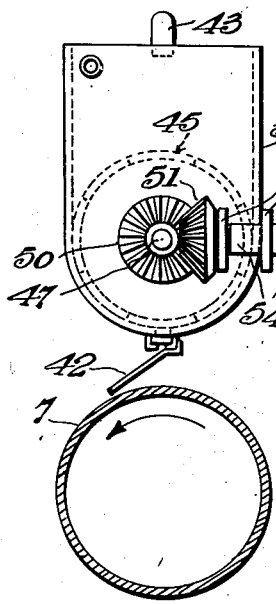

Fig. 6.

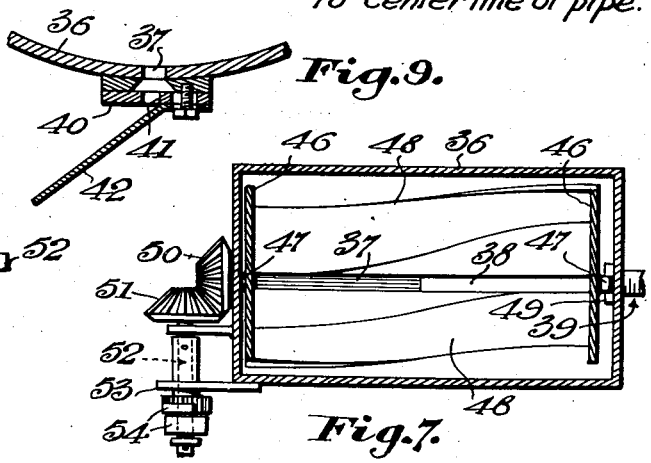

INVENTOR.
David W. Boylan,
BY
ATTORNEY.

Patented Oct. 11, 1938

2,133,014

UNITED STATES PATENT OFFICE 2,133,014

PIPE COATING APPARATUS

David W. Boylan, San Francisco, Calif., assignor to General Paint Corporation, San Francisco, Calif., a corporation of Nevada Application October 28, 1936, Serial No. 108,109

10 Claims. (Cl. 91—43)

The invention relates generally to pipe coating apparatus and has for an object to provide a novel, compact apparatus of the character stated in which provision is made for coating the pipe in a novel manner, the pipe coating being accomplished by novel mechanism enabling the formation of cut-offs or the leaving of uncoated portions at the positions of pipe joints.

Another object of the invention is to provide a novel form of coating applicator from which the coating may flow gently onto the pipe or wrapping material surface-to-be-coated, without force or turbulence, in the form of a heavy velvety ribbon, and in which provision is made for controlling the thickness of the ribbon and also the width thereof whereby to enable the formation of transverse coating cut-offs or bare spaces at proper positions on the pipes in order to facilitate future assembly coupling thereof.

Another object of the invention is to provide a novel arrangement of an applicator designed not only to more efficiently coat the pipes but also to eliminate the heretofore necessary longitudinal movement of the applicator with the pipe sections-being-coated in order to form the transverse cut-offs, thereby providing a much more compact and rigid apparatus than has heretofore been possible.

With the above and other objects in view that will hereinafter appear, the invention further resides in the novel details of construction, combination and arrangement of parts, all of which will be first fully described in the following detailed description, then particularly pointed out in the appended claims, reference being had to the accompanying drawings.

In the drawings:

Figure 1 is a somewhat diagrammatic side elevation of a pipe coating and wrapping apparatus embodying my invention.

Figure 2 is a somewhat diagrammatic plan view illustrating the coating and wrapping apparatus.

Figure 3 is a vertical cross section taken on the line 3—3 on Figure 2.

Figure 4 is a detail longitudinal section of one of the coating applicators, fragments of coupled pipe sections being coated thereby being somewhat diagrammatically shown in side elevation.

Figure 5 is a detail side elevation of a coupling which may be employed for joining pipe sections.

Figure 6 is an end view of the coating applicator shown in Figure 4.

Figure 7 is a horizontal section of the applicator.

Figure 8 is an isometric perspective view of the rotor of the applicator.

Figure 9 is an enlarged detail vertical section of the applicator illustrating the flow throatway adjusting means.

Figures 10 and 11 are diagrammatic plan views respectively illustrating the commencement and the completion of a transverse coating cut-off formed on the felt wrapping material as it is being applied to the pipe sections.

In the drawings in Figures 1, 2 and 3, I have illustrated my invention embodied in a pipe coating and wrapping machine in which pipe sections are coated and wrapped with coated felt paper and with kraft paper, and by reason of the embodiment of my invention, the machine is made more rigid and compact, as well as more efficient.

The wrapping machine proper is generally designated A, the supporting trackways upon which the pipe sections are fed into the machine is designated B, the take-off trackway C, the feeding unit by which the pipe sections are rotated and fed longitudinally through the machine is designated D, the felt paper delivering unit E, the kraft paper delivering unit is designated F, and the coating applicator units are designated G.

The feed-in trackway B includes upper supporting rails 5 which support the wheeled dollies 6 on which the pipe sections 7 are supported, said sections preferably being coupled together in multiple by suitable coupling devices generally designated 9. One of these couplings is shown in detail in Figure 5 and for details of construction of a coupling adapted to my present purposes see my Patent 1,948,956, issued Feb. 27, 1934.

At its delivery end the trackway B includes a dolly return incline 10 from which the dollies freed from beneath the supported pipe sections are delivered onto the lower or return tracks 11. At the receiving end of the trackways, a pneumatic or hydraulic dolly lift 12 is provided for lifting the dollies delivered from the return tracks 11 into position for being conveniently returned to the upper tracks 5.

The take-off trackway C is substantially identical in construction and includes the upper tracks 13, the incline 14, the dolly return tracks 15, and the dolly lift 16.

These feed-in and take-off trackways B and C are disclosed in detail in the patent to Kramer 1,883,964, issued Oct. 25, 1932, and the detailed construction thereof forms no part of my present invention.

The wrapping machine proper is disposed between the trackways B and C as shown in Figure 1 of the drawings and within this machine, or, in other words, in the interval between the trackways, the pipe sections coupled in multiple are supported on and have imparted thereto both rotary and longitudinal movement by a suitable feed unit such as is disclosed in the patent to Wieland et al. 1,572,258, issued Feb. 9, 1926. This feeding unit is capable of imparting to the pipe sections simple rotary motion about their axes or both rotary and longitudinal movement at varied speeds. The unit includes supporting and feeding rollers 17, holddown devices generally designated 18, and a shiftable frame 19 whereby the angularity of the rollers may be varied so as to vary the speed at which the pipe sections are fed longitudinally. The specific form of pipe feeding mechanism forms no part of my present invention and for the details of construction and operation of this unit reference may be had to the patent referred to above.

The machine proper hereinbefore designated A, comprises a base 20, a frame 21, and a drip catch pan 22 having a waste collection sump 23. A coating material reservoir 24 is supported upon the frame and from this reservoir the preferably hot bituminous coating material is fed to the applicators through a suitable valve controlled delivery pipe 25. A return conduit 26 including a pump 27 may be employed for returning waste coating material collected in the sump 23 to the reservoir 24.

The felt and kraft paper feeding units E and F are identical in construction and each includes a frame 28 and supporting legs 29. The legs 29 rest upon the floor and the other end of the unit may rest upon the drip pan or be otherwise supported. By merely resting the end of the unit upon the drip pan, the feed units may be readily shifted to the proper angular relation with the pipe sections determined by the manner in which said sections are being driven at the particular time.

Each of the units E and F provides trunnion supports for the paper roll 30 and is equipped with a suitable brake or friction drag 31. The paper leaving the roll 30 passes up over an idler roll 32, thence under an idler roll 33, thence up over another idler roll 34, and thence under and around the pipe section being wrapped as indicated at 35. See Figures 2 and 3.

In Figure 4 of the drawings, I have disclosed a single coating applicator and fragments of two coupled pipe sections. It is to be understood that my improved applicator is adapted to use in coating pipe sections regardless of whether or not said sections are to be later wrapped, and this figure of the drawings will serve to illustrate this phase of the invention.

When pipe sections are to be assembled in formation of conduits, it is desirable that the coating thereon be terminated adjacent the ends so as to facilitate the assembly coupling. My improved applicator is designed to not only apply the coating material in the form of a heavy velvety ribbon but also to form the cut-offs adjacent the ends of the pipe sections as stated.

My improved coating applicator, or in other words, each of the applicator units G, comprises a hopper 36 having a discharge throatway 37 controlled as to the extent of its effective opening by a slide gate 38. The slide 38 may be graduated if desired as indicated at 39 so as to facilitate determination of the extent of its opening. To further control the outpouring of coating material the throatway 37 is defined laterally by a stationary blade 40 and an adjustable blade 41, through the medium of which the thickness of the ribbon or the cross sectional dimensions of the throatway may be varied. After leaving the variable throatway 37, the coating material flows freely over a delivery lip 42 and from thence onto the pipe section, as shown in Figures 4 and 6 of the drawings.

Each applicator unit includes an inlet pipe through which the coating material flows into the hopper and an overflow from which excess material may drain. When the units are mounted in multiple in the machine, as illustrated in Figures 1, 2 and 3, the coating material is delivered from the pipe line 25 into the respective hoppers through delivery pipes 43 and may overflow from said units into the drip pan 22 through individual overflow pipes 44.

Within each hopper 36 a coating ribbon discharge control valve 45 is mounted. This valve comprises a pair of end plates 46 from which project trunnions 47, and four equidistantly spaced cut-off strips 48 joining the plates and each forming a portion of a wide pitched helix thus presenting cut-off edges bearing angular relation to the discharge throatway 37 and solid portions which can be presented to close off said throatway when it is desired to terminate flow therethrough.

The valve trunnions are rotatably supported at 49 in bearings provided therefore in the hopper 36 and one thereof is extended beyond the hopper and has secured thereon a beveled gear 50 which meshes with a similar gear 51 carried on a stub shaft 52 rotatable in suitable bearings 53. Rotation may be imparted to the stub shaft through the medium of a hand-wheel or any other suitable mechanism but in this disclosure I have shown ratchet and lever equipment 54 conveniently positioned as illustrated in Figure 2 of the drawings and by which the desirable step-by-step rotation may be imparted to the rotary valve. See Figures 2, 4, 6, 7, 8, and 9.

Assuming coupled pipe sections 7 to be rotating as indicated by the arrow $x$, and moving longitudinally as indicated by the arrow $y$, see Figure 4, and the rotary valve positioned to permit the outflow of coating material, the coating material will flow out of the controlled throatway 37 and over the lip 42 onto the pipe forming thereon a helical ribbon. When it is desired to terminate the coating transversely, as indicated at the right in Figure 4, in order to provide an annular bare space to facilitate future coupling, the valve controlled devices are manipulated to cause an advancing blade edge to gradually close over the discharge throatway 37. This closure is effected progressively in the direction of longitudinal travel of the pipe and at the same speed at which the pipe is traveling, thus gradually narrowing the ribbon and providing the transverse cut-off. It will be obvious that in the formation of this cut-off the coating ribbon is gradually reduced from full width to zero.

When it is desired to again start coating in suitably spaced relation at the opposite side of the coupling 9, the valve control devices are again manipulated, this time to gradually open the discharge throatway 37. This time the receding or trailing edge of the same blade which previously had gradually closed the discharge throatway is effective to gradually open said throatway, the opening being formed progressively in the direction of longitudinal movement of the pipe and at the same speed. In this manner the width of the ribbon of coating material is gradually increased from zero to full width and the leading edge, because of the feed control, will be laid transversely to provide the desired cut-off as shown.

In the wrapping machine disclosed in Figures 1, 2 and 3 of the drawings, three of my improved coating applicator units are mounted in cooperative relation. By reference to Figure 2 of the drawings, it will be seen that one of the units is positioned directly over the line of feed of the pipe sections so as to deposit its ribbon of coating material on top of the traveling pipe sections. Another of the units is positioned over the infeeding web of felt paper so as to apply the coating material to the upper surface thereof or that surface which is opposed to the pipe sections about which it is wrapped, and the third unit is mounted as was the first mentioned unit over the line of feed of the pipe sections in position for depositing its ribbon of coating material onto the pipe sections after they have been wrapped with the felt paper and just prior to the wrapping thereof with the kraft paper. See Figures 1 and 2. In order to adapt the mechanism for the wrapping of pipes of various sizes, the applicator units may be vertically-adjustably supported in any approved manner as indicated at 55.

By employment of three of my applicator units mounted as above described, I am able to efficiently apply the coating to the exterior surface of the pipe sections, to the surface of the felt paper opposed to the pipe sections, and upon the pipe sections after they are wrapped by the felt paper and before the kraft paper is applied thereby causing the kraft paper to adhere to but completely conceal the last applied coating.

In the wrapping of the pipes, I have heretofore applied the coating material through the medium of an applicator known in the art as a "granny rag". Two such "granny rags" were employed and were in the nature of a sling-like device suspended across the machine beneath the pipe sections and onto which the coating material was poured to be thereafter applied to the pipe sections by pressing the "granny rags" against the pipe sections. This method of coating the pipes was in a measure successful but the accumulation of coating material in the wedge-like pocket naturally forming between the rag and pipe surface agitated and imparted a certain turbulence to the collected coating material which tended to form air bubbles and the formation of air pockets, and resultant imperfections in the pipe coating could not be avoided. In this form of coating it was possible to form the desired cut-offs at the ends of the pipe sections by moving the "granny rags" longitudinally at the same speed at which the pipe sections were traveling whenever it was desired to form a cut-off. This practice obviously necessitated the provision of undesirable length in the machine, it being necessary, in the formation of each cut-off, to move the rag along with the pipe a distance of about three feet. By employment of my improved stationarily mounted units, I avoid the deficiencies of coating application above referred to and also make it unnecessary to move the applicator during the formation of the desired cut-offs. By this means the necessary length of the machine is considerably reduced and thus a more rigid compact mechanism is provided.

The manner of forming the transverse cut-offs in the coating applied directly to the external pipe surface and to the pipe surface after it has been wrapped with the felt paper and just before the application of the kraft paper will be obvious from the description applied hereinbefore to Figure 4 of the drawings. By suitably manipulating the control devices associated with the applicator mounted over and adapted for depositing coating material upon the felt paper a transverse cut-off of this coating function may likewise be accomplished, as is diagrammatically illustrated in Figures 10 and 11 of the drawings, thus leaving bare that portion of the felt paper which is wrapped over the bare portions at each side of the coupling as illustrated in Figure 4 of the drawings and facilitating removal of the paper from these portions. By similarly manipulating the applicator mounted just in advance of the kraft paper wrapping station, the coating material may be omitted beneath that portion of the kraft paper which overlies said bare areas and this paper also may be conveniently removed when desired.

As is diagrammatically illustrated in Figure 10 of the drawings, as the wrapping of the felt paper approaches alinement with the coating cut-off previously formed at the advance side of the particular coupling, the rotary valve of the particular coating applicator is moved so that the advance angled edge of the blade thereof adjacent the throatway 37 will gradually close off the throatway in proper timed relation to the longitudinal feed speed of the pipe thereby discontinuing the application of coating material to the felt paper along the line indicated at 56 truly transverse to the axis of the pipe sections and leaving an uncoated area 57 to overly the uncoated pipe area adjacent said coupling. After an interval sufficient to provide an uncoated area 57 equivalent to the uncoated pipe section area at either side of the coupling hereinbefore described the rotary valve is again manipulated to cause the trailing edge of the blade which previously gradually closed the throatway 37 to gradually open said throatway in timed relation to the longitudinal feed speed of the coupled pipe sections thereby re-starting the coating of the felt paper along a line 58 truly transverse to the axis of said pipe sections.

In the foregoing description I have disclosed a novel form of coating applicator from which the coating material may freely flow onto the surface-to-be-coated in the form of a heavy velvety ribbon and in which is embodied novel means for gradually discontinuing the flow of the coating material in a manner facilitating the provision of transverse cut-offs. I have also shown a novel cooperative relation of several such units in a wrapping machine which is more compact and rigid than machines of this type which have heretofore been provided.

It is of course to be understood that the details of structure and arrangement of parts may be variously changed and modified without departing from the spirit and scope of my invention.

I claim:

1. In apparatus of the character described, means for applying to a pipe surface a helical ribbon of coating material, and means for gradually decreasing the width of the ribbon from full width to zero whereby to provide a transverse coating cut-off.

2. In apparatus of the character described, means for applying to a pipe surface a helical ribbon of coating material, and means for at the beginning of the coating applying operation gradually increasing the width of the ribbon from zero to full width whereby to begin said coating on a transverse line.

3. In apparatus of the character described, means for applying to a pipe surface a helical ribbon of coating material, and means for first decreasing the width of the ribbon from full width to zero and for thereafter increasing the width of the ribbon from zero to full width whereby to provide an annular bare space.

4. In apparatus of the character described, means to impart rotary and longitudinal movement to a pipe section, means to apply a ribbon of coating material to the traveling pipe section, and means whereby the width of the ribbon can be gradually reduced from full width to zero to form a transverse cut-off.

5. In apparatus of the character described, means to impart rotary and longitudinal movement to a pipe section, means to apply a ribbon of coating material to the traveling pipe section, and means whereby the width of the ribbon can be gradually increased from zero to full width whereby to start the coating application on a transverse line.

6. In apparatus of the character described, means to impart rotary and longitudinal movement to a pipe section, means to apply a ribbon of coating material to the traveling pipe section, and means whereby the width of the ribbon can be gradually decreased from full width to zero and again increased from zero to full width to form an annular bare space defined by two transverse lines.

7. A coating applicator comprising a hopper having a longitudinal discharge throatway, and a rotor having a blade movable to close or open said throatway and having a leading edge and a trailing edge each bearing angular relation to said throatway and adapted when the rotor is rotated to successively open and close said throatway from end to end.

8. A coating applicator comprising a hopper having a longitudinal discharge throatway, and a rotor having a blade movable to close or open said throatway and having a leading edge and a trailing edge each bearing angular relation to said throatway and adapted when the rotor is rotated to successively open and close said throatway from end to end, and means for imparting step-by-step rotation to said rotor.

9. A coating applicator comprising a hopper having a longitudinal discharge throatway, and a rotor having a plurality of equidistantly spaced blades each of a width capable of at times completely closing said throatway and resembling a portion of a helix whereby to present a leading edge and a trailing edge each bearing angular relation to said throatway whereby when the rotor is rotated the throatway will be successively opened and closed from end to end.

10. A coating applicator comprising a hopper having a longitudinal discharge throatway, and a rotor having a plurality of equidistantly spaced blades each of a width capable of at times completely closing said throatway and resembling a portion of a helix whereby to present a leading edge and a trailing edge each bearing angular relation to said throatway whereby when the rotor is rotated the throatway will be successively opened and closed from end to end, and means including ratchet and lever equipment for imparting step-by-step rotation to the rotor.

DAVID W. BOYLAN.